Jan. 3, 1950 L. KALMAN 2,493,673
OPTICAL COMPARISON EXPOSURE METER USED IN
PHOTOGRAPHIC ENLARGING OR
REPRODUCING WORK
Filed Aug. 6, 1947

INVENTOR.
Laszlo Kalman
BY Haseltine, Lake & Co.
AGENTS.

Patented Jan. 3, 1950

2,493,673

UNITED STATES PATENT OFFICE 2,493,673

OPTICAL COMPARISON EXPOSURE METER USED IN PHOTOGRAPHIC ENLARGING OR REPRODUCING WORK

Laszlo Kalman, La Tour-de-Peilz, Switzerland

Application August 6, 1947, Serial No. 766,624
In Switzerland December 5, 1941

Section 1, Public Law 690, August 8, 1946
Patent expires December 5, 1961

2 Claims. (Cl. 88—23)

This invention has for its object improvements in or relating to exposure meters used in photographic enlarging or reproducing work.

Exposure meters known heretofore and used for enlarging purposes, operating by means of a photo-cell, possess the disadvantage of permitting only the measurement of the mean brightness of a picture or portion thereof. Since, however, the correct time of exposure must be attuned to the most intense lights, i. e. the brightest spots of the positive picture, such meters cannot give us satisfactory results. On the other hand, there also are devices by means of which the brightness of a very small portion or picture point only is being measured. These devices exclusively operate on the principle of the light comparison method, as represented, e. g., by Bunsen's grease spot photometer. In spite of the good accuracy of measurement, such devices also cannot be used with success, since the brightness of the darkest spots of the negative is not sufficient for adapting the time of exposure to the brightest spots of the positive picture with sufficient accuracy.

The purpose of the present invention is the design of an instrument for determining the time of exposure for photographic enlarging or reproducing work, which eliminates the disadvantages mentioned.

When using the device according to the present invention, one also operates according to the light comparison method, but the brightness of the projected image is measured in translucence or by looking through it instead of by looking at it, as in the devices known heretofore, thereby materially increasing the brightness of the picture to be measured. Viewing in translucence is made possible by turning the image which is projected, e. g., by the objective of the enlarging apparatus, out of its direction by means of a mirror and onto a plane of the instrument.

The accompanying drawing illustrates one form of invention, in which—

Figure 1:
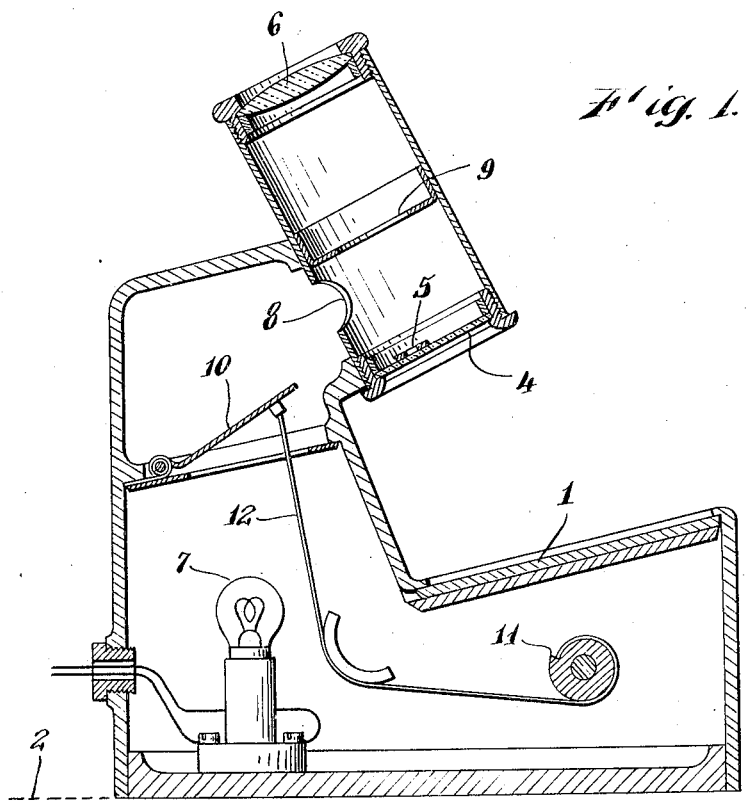

Fig. 1 shows a vertical section through the instrument, and

Figure 2:
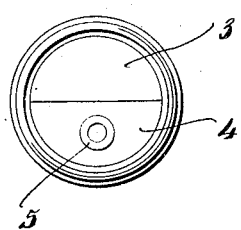

Fig. 2 a plan view of the image trapping plane structure.

The image thrown by the objective (not shown) of the enlarging device onto the plane of projection 2 is turned, by means of the mirror 1, onto the plane 3—5. The latter, over one half of the field of view, comprises a fine-grain ground glass serving for observing the sharpness of the picture 3, and a more intensely diffusing translucent plane 4 on the other or lower half of the field of view. A small, opaque, white annulus 5 serving as an illuminated surface of comparison is mounted upon the plate 4 and faces the observer. The plane 3, 4 is viewed from above through the magnifying lens 6. The said annulus 5 is diffusely illuminated by the incandescent lamp 7 through the aperture 8. The ring baffle 9 prevents the direct rays from the lamp from reaching the observer's eye, and, on the other hand, increases the degree of diffusion of the illumination of the ring 5 by diffusely reflecting the rays emitted by the lamp from the white underside of the ring baffle. The luminous intensity of the ring 5 may be varied by means of the light flap 10. The latter is controlled from the rotatable curved disk 11 by means of the cord 12. The dampening of the light obviously also could be effected by other means known per se, such as a displaceable grey wedge, an electrical resistance in the lamp circuit, or cross polarization prisms. In order to obtain a sharp picture the plane of the mirror 1 halves the angle included by the plane of projection 2 and the plane 3, 4.

The time of exposure is determined by comparing the brightness of the small annulus 5 with that of the darkest spot of the projected negative picture. The illumination of the said small ring 5 is being changed until its brightness agrees with the blackest portion of the projected image viewed in translucence. The measure of change of the illumination of the annulus 5 gives a measure for the time of exposure. Of course for an exact determination of the time of exposure the apparatus has to be calibrated, due consideration being given to the quality of the positive paper to be used.

Having now particularly described and ascertained the nature of my said invention and in what manner the same is to be performed, I declare that what I claim is:

1. A device for measuring the time of exposure in the photographic magnification or reproduction of pictures comprising a plane mirror, a plane structure arranged for receiving an image from said mirror, an eye piece arranged at the side of said plane structure opposite to said mirror, said plane structure including a fine grain ground glass portion serving for observing the sharpness of the picture and a more intensely diffusing translucent portion, a small opaque white spot arranged on said translucent portion on the side facing said eye piece, a light source arranged to direct light on the eye piece side of said spot, and means for varying the brightness of said light on said spot.

2. A device for measuring the time of exposure in the photographic magnification or reproduction of pictures comprising a plane mirror, a plane structure arranged for receiving an image from said mirror, a plane of projection, the plane of said mirror halving the angle included by said plane structure and said plane of projection, an eye piece arranged at the side of said plane structure opposite to said mirror, said plane structure including a fine grain ground glass portion serving for observing the sharpness of the picture and a more intensely diffusing translucent portion, a small opaque white spot arranged on said translucent portion on the side facing said eye piece, a light source arranged to direct light on the eye piece side of said spot, and means for varying the brightness of said light on said spot.

LASZLO KALMAN.

REFERENCES CITED

The following references are of record in the file of this patent:

UNITED STATES PATENTS

| Number | Name | Date |
|---|---|---|
| 2,333,759 | Alkelaitis | Nov. 9, 1943 |

FOREIGN PATENTS

| Number | Country | Date |
|---|---|---|
| 499,052 | Great Britain | Jan. 18, 1939 |